United States Patent

Kamihira et al.

[11] Patent Number: 6,151,548
[45] Date of Patent: *Nov. 21, 2000

[54] INTEGRATED CONTROLLING SYSTEM

[75] Inventors: Ichikai Kamihira; Masashi Yamaguchi, both of Iwata, Japan

[73] Assignee: Yamaha Hatsudoki Kabushiki Kaisha, Shizuoka-ken, Japan

[*] Notice: This patent is subject to a terminal disclaimer.

[21] Appl. No.: 09/370,536

[22] Filed: Aug. 9, 1999

Related U.S. Application Data

[63] Continuation of application No. 08/884,210, Jun. 27, 1997, Pat. No. 6,021,369.

[30] Foreign Application Priority Data

Jun. 27, 1996 [JP] Japan ................................ 8-167070
Sep. 27, 1996 [JP] Japan ................................ 8-254602

[51] Int. Cl.$^7$ ........................................................ G06F 19/00
[52] U.S. Cl. .................... 701/102; 701/106; 701/58; 701/59; 701/114; 706/25
[58] Field of Search .................................... 701/102, 101, 701/114, 106; 706/13, 25; 340/825.06; 123/435, 436

[56] References Cited

U.S. PATENT DOCUMENTS

| | | | |
|---|---|---|---|
| 5,445,128 | 8/1995 | Letang et al. | 123/436 |
| 5,508,689 | 4/1996 | Rado et al. | 340/825.06 |
| 5,978,729 | 11/1999 | Landes et al. | 701/115 |
| 6,021,369 | 2/2000 | Kamihira et al. | 701/102 |

FOREIGN PATENT DOCUMENTS 10333705  12/1998  Japan ................................ 701/102

*Primary Examiner*—Henry C. Yuen
*Assistant Examiner*—Hieu T. Vo
*Attorney, Agent, or Firm*—Knobbe, Martens, Olson & Bear, LLP

[57] ABSTRACT

An integrated control for a subject such as an engine installed in a vehicle or vessel is conducted by the steps of: determining the characteristics of a user and/or using conditions; and changing characteristics of a control system of a subject in accordance with the determined characteristics. Normally, the control system includes: a reflection hierarchy for outputting a basic output; a learning hierarchy for learning and operation; and an evolutionary-adaptation hierarchy for selecting the most adaptable module. The subject is "trained" to suit the characteristics of the user and/or the using conditions.

7 Claims, 17 Drawing Sheets

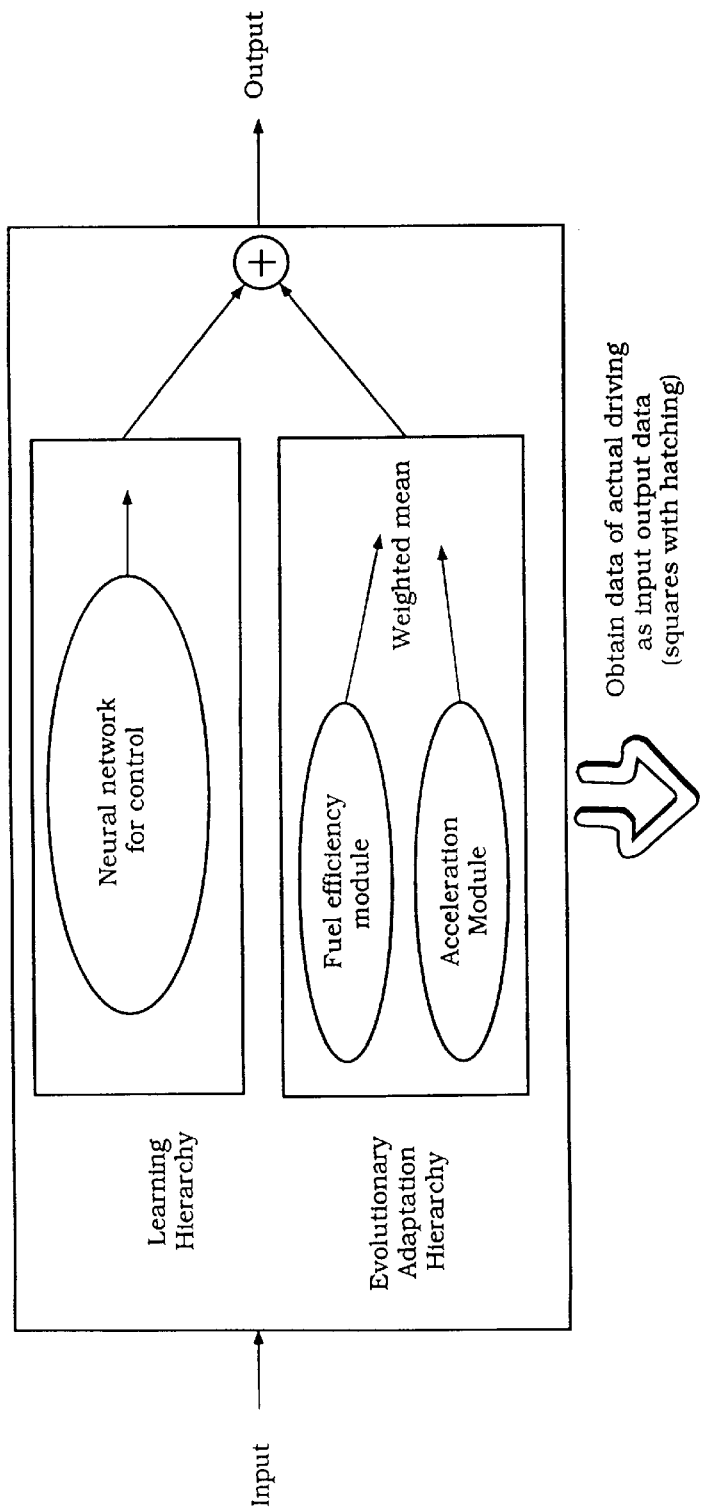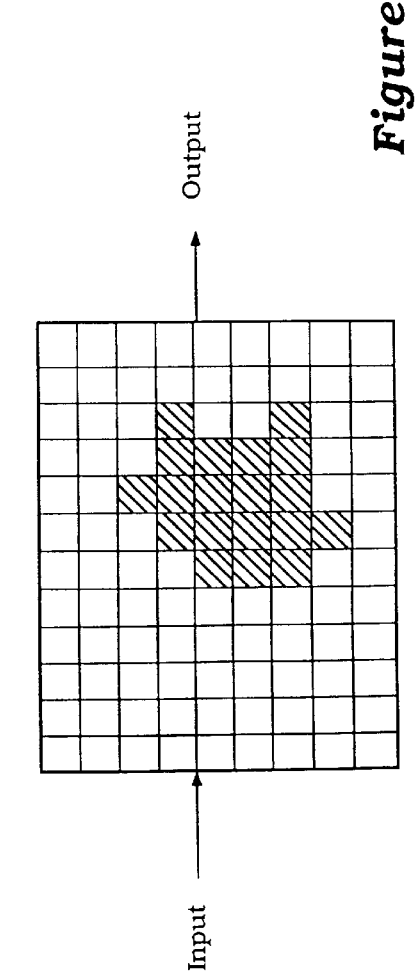
Figure 15

INTEGRATED CONTROLLING SYSTEM

This is a continuation application of U.S. patent application Ser. No. 08/884,210, filed Jun. 27, 1997, now U.S. Pat. No. 6,021,369 issued Feb. 1, 2000.

BACKGROUND OF THE INVENTION

This invention relates to an integrated controlling system, and particularly to that for comprehensively controlling a subject.

Heretofore, when a control system or control characteristics of a subject, such as vehicles and electrical appliances, is designed, imaginary users are selected, and the users' preferences and their using conditions are taken into consideration. The characteristics of the subject are determined in such a way as to adapt the subject to users in as broad a range as possible.

However, each individual user has a particular and unique personality, and thus, their preferences are diverse. Thus, there is a problem in that even if imaginary users are selected to develop and design a product for the users by presuming the users' preference, it is impossible to satisfy all of the users of the product.

In order to solve the above problem, prior to purchase of a product, a prospective user is requested to determine whether or not the product is satisfactory to the user after checking the characteristics of the product in light of the user's preferences. However, it is troublesome for the user to check the characteristics of the product before the purchase. Further, because a series of products are often operated or controlled by characteristics common in the products, although the design of the product is changed depending on the user's preferences, the user may not like other operational characteristics. Thus, although the design is appealing to some prospective users, the users may not purchase the product since the operational characteristics do not appeal to them. In the other words, there is another problem in that the range of users is limited and depends on the operational characteristics.

An objective of the present invention is to provide a integrated control system to construct characteristics which can satisfy all users.

SUMMARY OF THE INVENTION

One important aspect of the present invention attaining the above objective is an integrated control method comprising the steps of: determining the characteristics of a user and/or using conditions; and changing characteristics of a control system of a subject in accordance with the determined characteristics. In the above, preferably, said control system outputs a basic output to control the subject, and the changing step comprises the steps of: creating multiple control modules for representing at least one factor to be controlled; selecting at least one control module most adaptable for a current operational state based on the determined characteristics of the user and/or using conditions; learning information from said at least one control module; compensating for the basic output based on the result of the selection and the learning; and controlling the subject using the output compensated for.

According to the present invention, the subject is "trained" to suit the characteristics of the user and/or the using conditions, thereby easing control of the subject particularly for the user and enjoying training and adapting the subject to the user's preference.

In the above, preferably, said control system comprises: a reflection hierarchy for outputting the basic output reflectively in response to input from the using conditions; an evolutionary-adaptation hierarchy for conducting the creating step, the selecting step, and the compensating step; and a learning hierarchy for conducting the learning step and the compensating step. In the above, preferably, said learning hierarchy comprises a control system for learning and a control system for operation, both control systems being interchangeable, wherein while the control system for learning is learning, the control system for operation is controlling the subject in cooperation with the reflection hierarchy.

In the above, preferably, the evolutionary-adaptation hierarchy is inactivated when the control system for learning completes learning. Further, after being inactivated, the evolutionary-adaptation hierarchy is activated at given intervals to check drift between an actual state and a state controlled by the reflection hierarchy and the control system for operation in the learning hierarchy, and when there is drift, the evolutionary-adaptation hierarchy resumes the creating step and the selecting step. Accordingly, by checking the control particulars at given intervals, it is possible to constantly maintain the most suitable operation against a change in the using environment or deterioration with age.

Further, in the above method, parameter-obtaining devices are not newly required. Existing devices can be used for obtaining necessary parameters, thereby lowering the cost.

When the subject to be controlled is an engine installed in a vehicle, the operation characteristics of the engine can be changed to suit the driver's preferences, and when control is conducted based on the driver's skill, suitable driving performance can be realized in accordance with the driver's skill and its improvement.

Since the user can train the subject (engine) based on the user's preference after its purchase, the user can give less weight to the characteristics of the engine itself, and can select a vehicle from a wide range at purchase.

When the subject to be controlled is an auxiliary power unit installed in a bicycle or a wheelchair, the characteristics of the auxiliary power unit (motor) can be changed to suit the user's preferences, thereby effecting assistance most customized to each individual user.

When the subject to be controlled is a robot, the characteristics of the robot can be changed to suit the user's preferences, thereby operating the robot in a way most suitable to each individual user.

When the subject to be controlled is a suspension system or seat, the characteristics of the damper of the suspension system or seat can be changed to suit the user's preferences, thereby obtaining characteristics of the damper most suitable to each individual user.

When the subject to be controlled is a steering system of a vehicle, the characteristics of steering control can be changed to suit the user's preferences, thereby obtaining customized steering control characteristics most suitable to each user.

The present invention can be applied not only to a method but also to a system. An appropriate system can be constructed accordingly. In addition, although the present invention can advantageously and preferably be applied to an engine, it can be applied to other machines as described above.

BRIEF DESCRIPTION OF THE DRAWINGS

FIG. 6 is a distribution pattern of the maximum r.p.m. at each gear position within a certain time period, which is used in the evaluation system of the evolutionary-adaptation hierarchy.

FIG. 7 is a distribution pattern of the maximum r.p.m. at each gear position within a certain time period, which is used in the evaluation system of the evolutionary-adaptation hierarchy. FIG. 7b shows a pattern when only the fifth and sixth gears are used (freeway).

FIG. 15 is a diagram showing how to obtain input and output data to control the engine, which are the sum of actual data of operation, an evolutionary compensation, and a basic compensation.

DETAILED DESCRIPTION OF THE PREFERRED EMBODIMENT

The integrated control system of the present invention will be explained further with reference to an embodiment shown in the figures described below.

Outline of Integrated Control System

Figure 1:
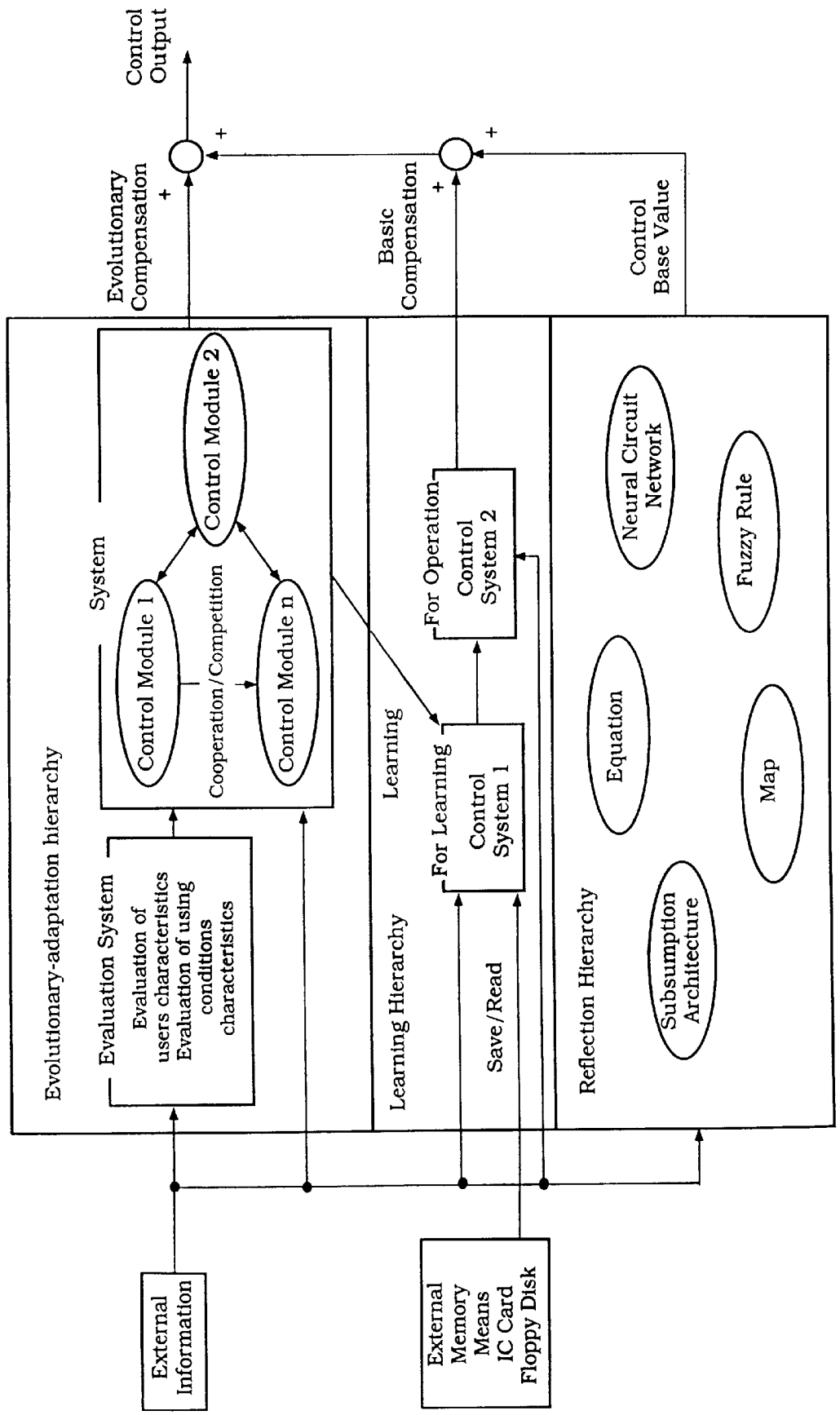
FIG. 1 is a block diagram showing the basic principle of an integrated control system according to the present invention.

FIG. 1 is a block diagram showing the basic principle of an integrated control system according to the present invention. As shown in FIG. 1, the integrated control system of this embodiment has three hierarchies, i.e., a reflection hierarchy, a learning hierarchy, and an evolutionary hierarchy, into which information related to the subject to be controlled, such as that related to a dynamic state, is input. Based on the information, a control base value is determined in the reflection hierarchy, and compensations for the control base value are determined in the learning hierarchy and in the evolutionary-adaptation hierarchy. A final control output is determined based on the control base value and the compensations.

The functions of the reflection hierarchy, the learning hierarchy, and the evolutionary-adaptation hierarchy in the integrated control system will be explained.

The reflection hierarchy is a hierarchy installing a relationship between information related to the subject to be controlled (hereinafter referred to as external information) and a control base value for the external information, in a control system such as in the form of equations, maps, fuzzy rules, neural network, or subsumption architecture. When the external information is input thereinto, a control base value is determined for the external information input from the control system. The above subsumption architecture is known to be a behavioral artificial intelligence which conducts parallel processing.

The evolutionary-adaptation hierarchy is comprised of an evaluation system and an evolutionary-adaptation system. The evaluation system is to input the external information and/or information related to user's characteristics (for example, preference, skill, or a state at the moment), and/or information related to user's using conditions (for example, a change in using environment), and based on the above information such as the external information, the characteristics of the user and/or the using conditions are evaluated. The evolutionary-adaptation system is provided with at least one control module to compensate for the control base value to suit the characteristics of the user and/or the using conditions. The at least one control module genetically evolves based on the determination in the evaluation system, and converts into a control module most suitable at the moment. Upon obtaining the most suitable control module, the control module is fixed in the evolutionary system which then outputs an evolutionary compensation which compensates for the control base value output from the reflection hierarchy.

The learning hierarchy is comprised of two control systems mutually switchable, one for learning and the other for operation. While the control system for operation operates control, the control system for learning learns the relationship of input and output regarding the most suitably evolved control module in the evolutionary-adaptation hierarchy in combination with the relationship of input and output regarding the control system for operation in the learning hierarchy. After completing the learning in the control system for learning, the control system operating control and the control system that has finished learning are switched over, whereby the control system after learning starts operating control using a control module obtained from the learning, whereas the control system previously operating control starts functioning as a control system for learning. Incidentally, the control system in the learning hierarchy is set so as to output zero at the beginning, i.e., control is conducted by the reflection hierarchy and the evolutionary hierarchy at the beginning.

The evolutionary hierarchy returns the output to zero after causing the learning hierarchy to learn information related to the most suitable control module. The evolutionary hierarchy functions at given intervals to evaluate the user's preference and/or the using environment and to cause the control module to evolve. If the evaluation in the case of adding the output from the evolutionary hierarchy is better than in the case of no addition of the output from the evolutionary hierarchy, the evolutionary hierarchy causes again the learning hierarchy to learn information related to the most suitable control module.

In addition, the information related to the after-learning control-module in the learning hierarchy is readably saved in external memory means such as an IC card and a floppy disk. The user can pull out the information related to the most suitable control module in the past from the external memory means, according to the user's need, and the user can thereby output a basic compensation from the learning hierarchy based on the information. In the above, when the user pulls out the information related to the most suitable control module in the past from the external memory means, and operates the learning hierarchy, while the learning hierarchy is functioning by the pulled-out control module, the output of the evolutionary hierarchy is set at zero, i.e., evolutionary processes of the control module(s) are stopped.

According to the integrated control system described above, by the function of each hierarchy, the control output is changing in accordance with changes in the characteristics such as the user's preference and the using environment, and as a result, the characteristics of the subject to be controlled are changing in accordance with the characteristics of the user and/or the using conditions. In the present invention, the state, wherein the characteristics of the subject evolves to suit them to the characteristics of the user and/or the using conditions, is referred to as "training".

Control Flow of Integrated Control System

Figure 2:
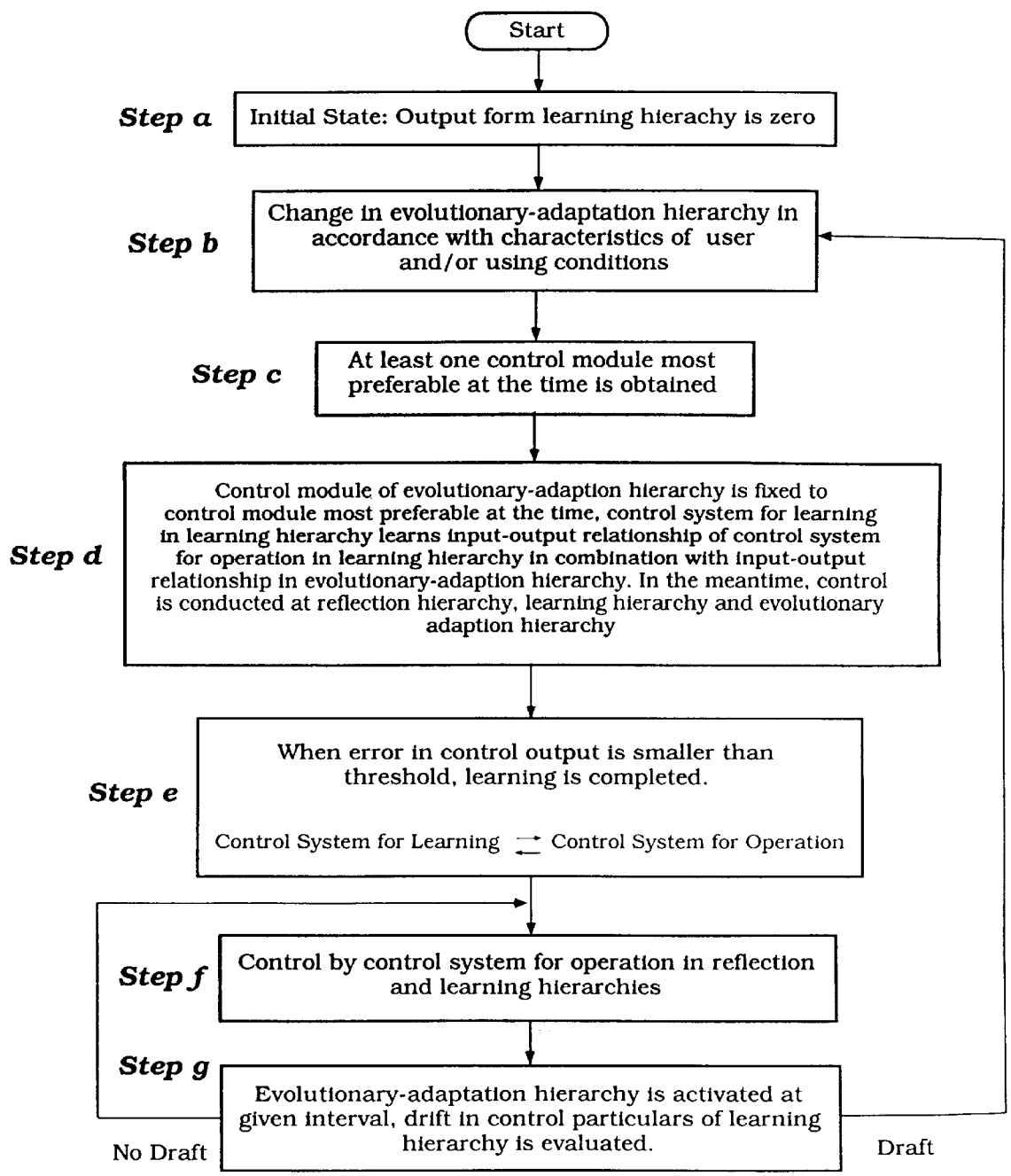
FIG. 2 is a flow chart of an integrated control system on a time basis, according to the present invention.

FIG. 2 is a flow chart of the integrated control system on a time basis.

In an initial state, the output from the learning hierarchy is zero (step a), and thus, immediately after the subject is activated, the subject is controlled only by the control base value from the reflection hierarchy.

After the subject is activated, the evolutionary-adaptation hierarchy evaluates the characteristics of the user and/or the using conditions, and in accordance with the evaluated value, the evolutionary-adaptation hierarchy causes a control module(s) to evolve (step b).

By genetically evolving each control module, the evolutionary-adaptation hierarchy obtains at least one control module most preferable at the moment (step c).

The evolutionary-adaptation hierarchy fixes the control module(s) to the most preferable control module obtained in step c, and outputs an evolutionary compensation using the fixed control module, thereby compensating for the control base value output from the reflection hierarchy. The learning hierarchy learns, in the control system for learning, the relationship of input and output in the evolutionary-adaptation hierarchy wherein the control module(s) is fixed to the most preferable control module, in combination with the relationship of input and output in the control system for operation in the learning hierarchy. In the above, whereas the output from the control system for operation in the learning hierarchy is zero in the initial state, after learning, the basic compensation from the learning hierarchy and the evolutionary compensation from the evolutionary-adaptation hierarchy compensate for the control base value from the reflection hierarchy (step d).

When the difference between the value, which is obtained by adding the output from the control system for learning in the learning hierarchy to the control base value, and the value, which is the actual output (control base value+basic compensation+evolutionary compensation), is smaller than a predetermined threshold, the learning in the learning hierarchy is completed. The control system for learning and the control system for operation are then switched over, i.e., the previous control system for learning functions as a control system for operation while the previous control system for operation functions as a control system for learning (step e). In this way, control is conducted by the reflection hierarchy and the learning hierarchy (step f).

After the evolutionary-adaptation hierarchy causes the learning hierarchy to learn information related to the most preferable control module, the evolutionary-adaptation hierarchy is activated at given intervals to evaluate a drift by age in the control particulars of the learning hierarchy (step g). In detail, if the maximum adaptability is no longer improved in the initial generation when the control module(s) of the evolutionary-adaptation hierarchy is genetically evolved, it is determined that there is no drift in the control particulars of the learning hierarchy, and then step f is activated wherein control by the reflection hierarchy and the learning hierarchy is continued; conversely, if the maximum adaptability is further improved, it is determined that a drift is detected, and then step b is activated wherein a new control module most adaptable in the evolutionary-adaptation hierarchy.

Integrated Control System Adapted to Engine of Vehicle

In an embodiment, the subject to be controlled is an engine installed in vehicles or vessels. However, in the integrated control system of the present invention, no restriction is imposed on the type of machine to be controlled, and as with the engine, a robot used in machine tools, a motor used in electrically-driven vehicles, or the like can be controlled by adopting the integrated control system based on the same principle as in the engine.

Figure 3:
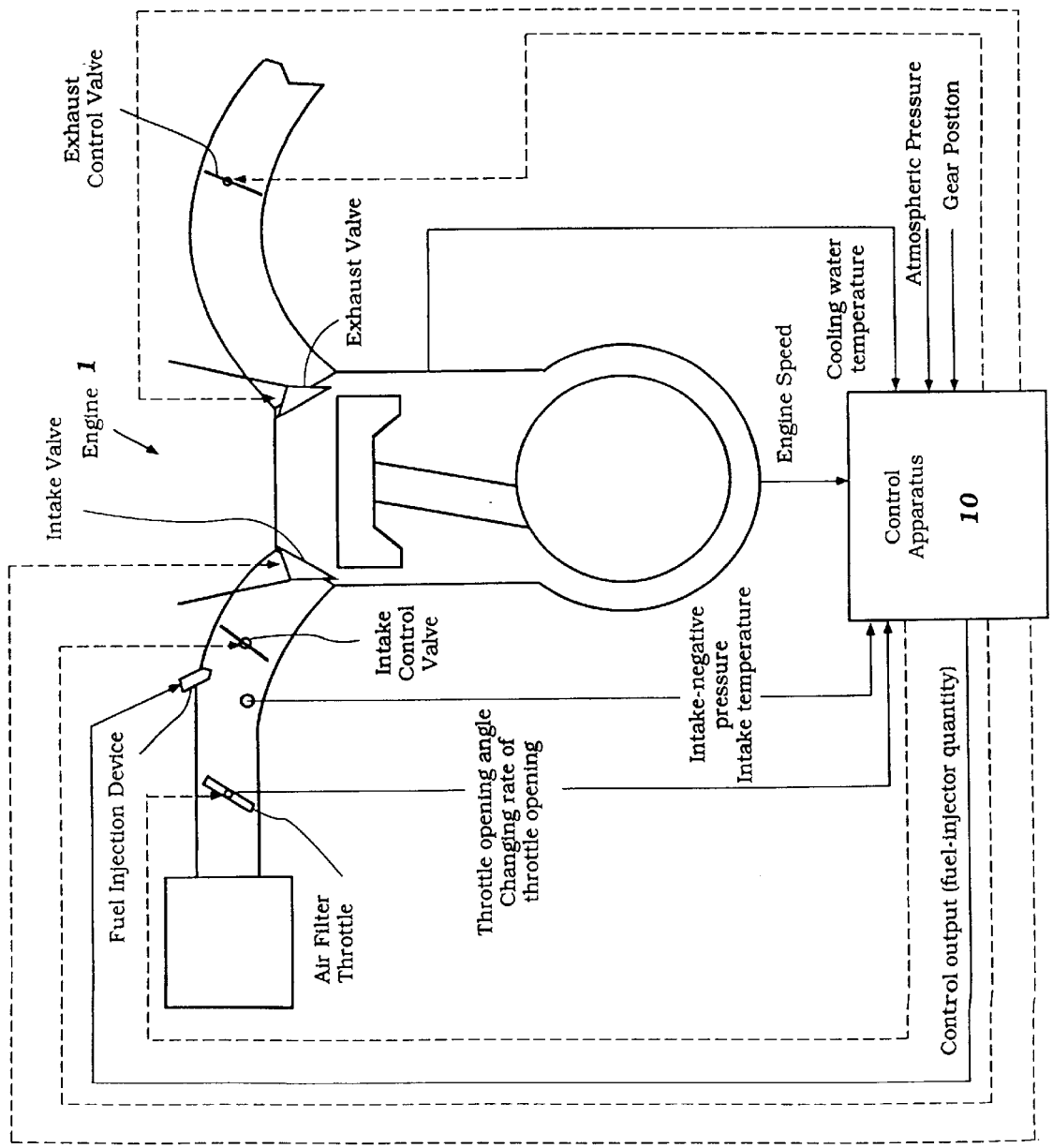
FIG. 3 is a schematic view showing the relationship between an engine and a control device performing the integrated control system of the present invention.

FIG. 3 is a schematic view showing the relationship between an engine 1 and a control device 10 performing the above-described integrated control system.

As shown in FIG. 3, the control device 10 controls the engine in such a way that fuel efficiency and acceleration performance are compatible with each other, based on information input into the control device, such as the engine speed (r.p.m.), the intake-negative pressure, the degree of the throttle opening (angle), the changing rate of the throttle opening, the atmospheric pressure, the intake temperature, the temperature of cooling water, and the position of the gear.

Figure 4:
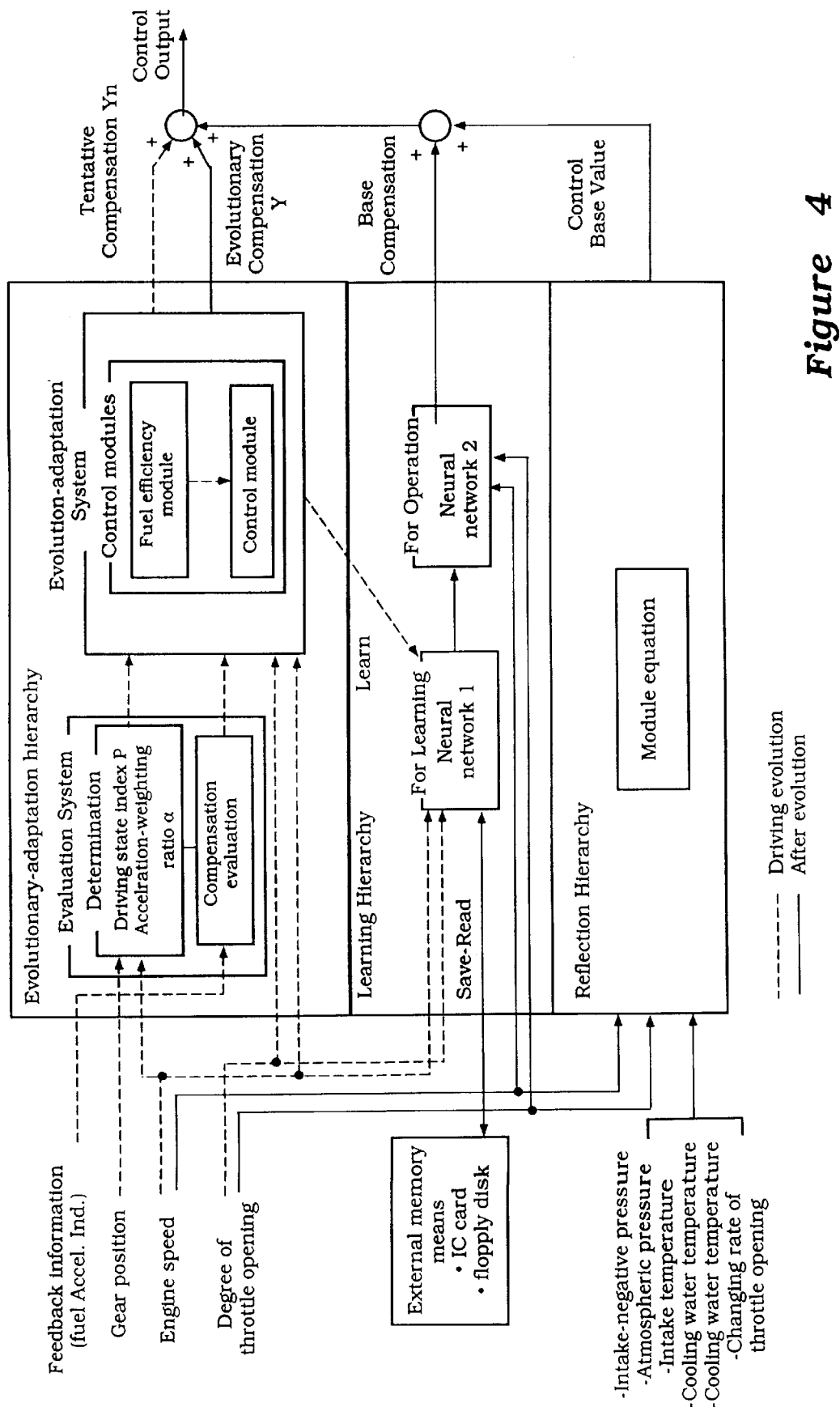
FIG. 4 is a schematic block diagram of a control unit used in an engine control system according to the present invention.

FIG. 4 is a schematic block diagram of the control device 10.

The control device 10 is comprised of the reflection hierarchy, the learning hierarchy, and the evolutionary-adaptation hierarchy as described above.

Reflection Hierarchy Adapted to Engine Control

The reflection hierarchy receives signals such as those of the engine speed, the intake-negative pressure, the degree of the throttle opening, the changing rate of the throttle opening, the atmospheric pressure, the intake temperature, and the temperature of cooling water, and the reflection hierarchy determines and outputs a basic value of fuel-injection quantity (i.e., the control base value of the fuel injection device) using an equation formed by modeling numerical formulae obtained from the above input signals.

Evolutionary-adaptation Hierarchy Adapted to Engine Control

The evolutionary-adaptation hierarchy is comprised of an evaluation system and an evolutionary-adaptation system.

Figure 5:
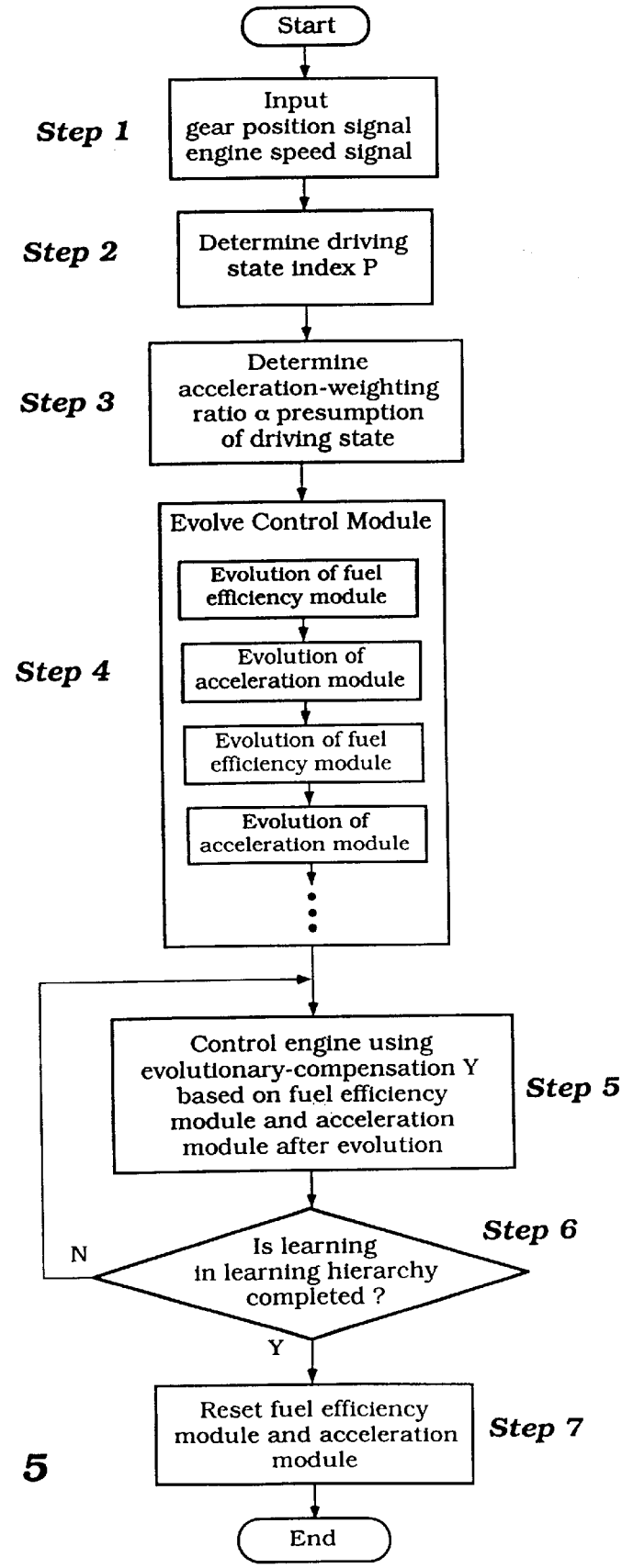
FIG. 5 is a flow chart showing a basic behavior of the evolutionary-adaptation hierarchy according to the present invention.

FIG. 5 is a flow chart showing a basic behavior of the evolutionary-adaptation hierarchy. The basic behavior of the evolutionary-adaptation hierarchy will be explained with reference to this chart.

Figures 6A, 6B:
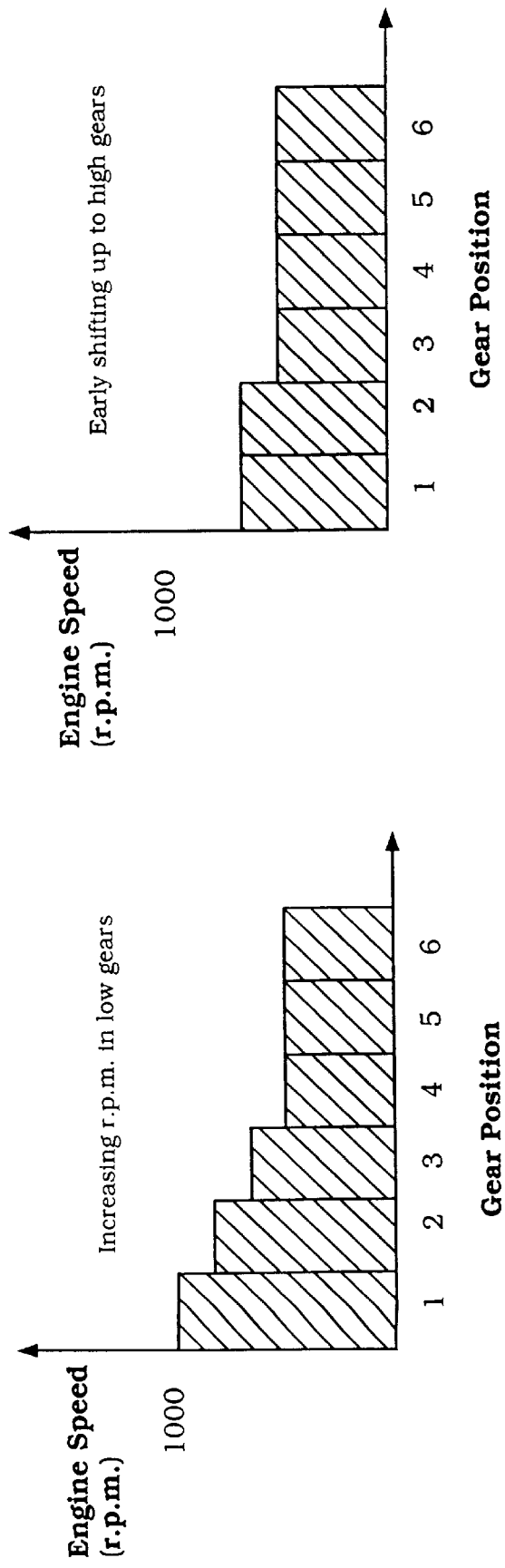
FIG. 6a shows a pattern when the r.p.m. is increased in low gears.
FIG. 6b shows a pattern when the gear is shifted up to high gears at an early stage.

The evaluation system is equipped with a neural network (see FIG. 8) which has learned the relationship between a distribution pattern of the maximum r.p.m. at each gear position within a certain time period (see FIGS. 6 and 7) and a driving state index P. A gear position signal and an engine r.p.m. signal are input into the neural network (step 1) to determine a driving state index P (step 2). For example, a user who likes sporty driving tends to increase the engine speed in low gears, and the distribution pattern of the engine speed can be represented by FIG. 6a. Conversely, a user who likes staid driving intend to shift up to high gears at an early stage, and the distribution pattern of the engine speed can be represented by FIG. 6b. When the neural network, as shown in FIG. 8, has learned the relationship between the engine speed and the driving state index P in such a way that driving state index P is high when the distribution pattern is represented by FIG. 6a, while driving state index P is low when the distribution pattern is represented by FIG. 6b, the neural network shows that the higher the preference for sporty driving, the higher the driving state index P becomes, while the higher the preference for staid driving, the lower the driving state index P becomes. In this way, the driving state index P can represent the user's preference.

Figures 7A, 7B, 7C:
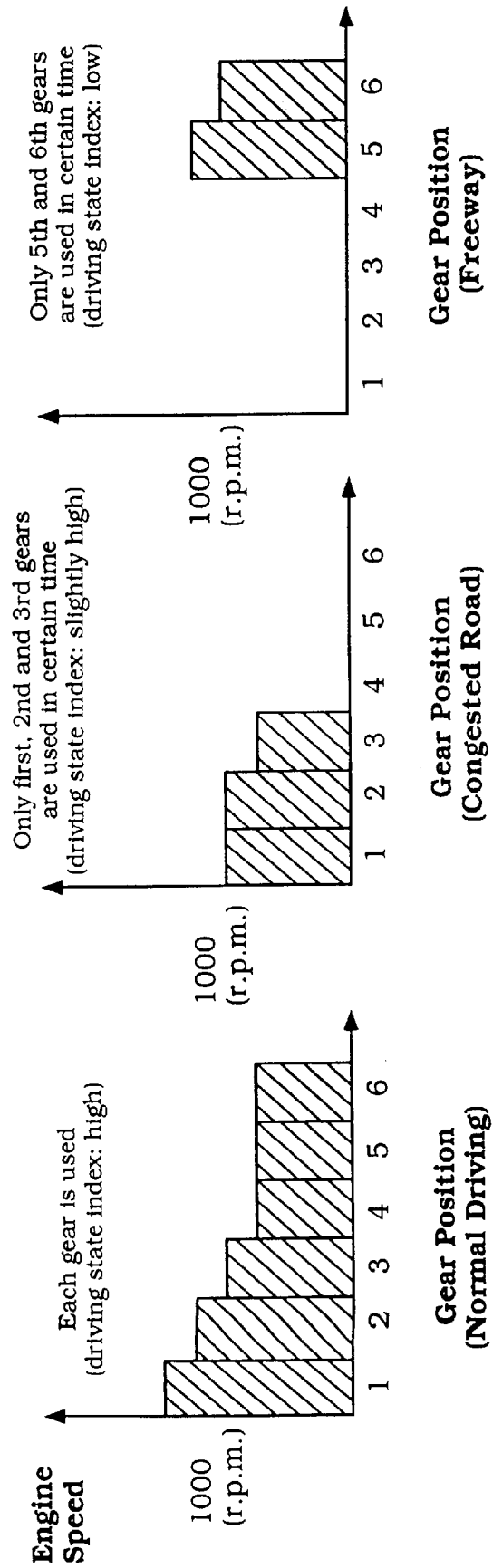
FIG. 7a shows a pattern when each gear is used (normal driving)
FIG. 7b shows a pattern when only the first, second, and third gears are used the r.p.m. is increased in low gears (congested road)
Figure 8:
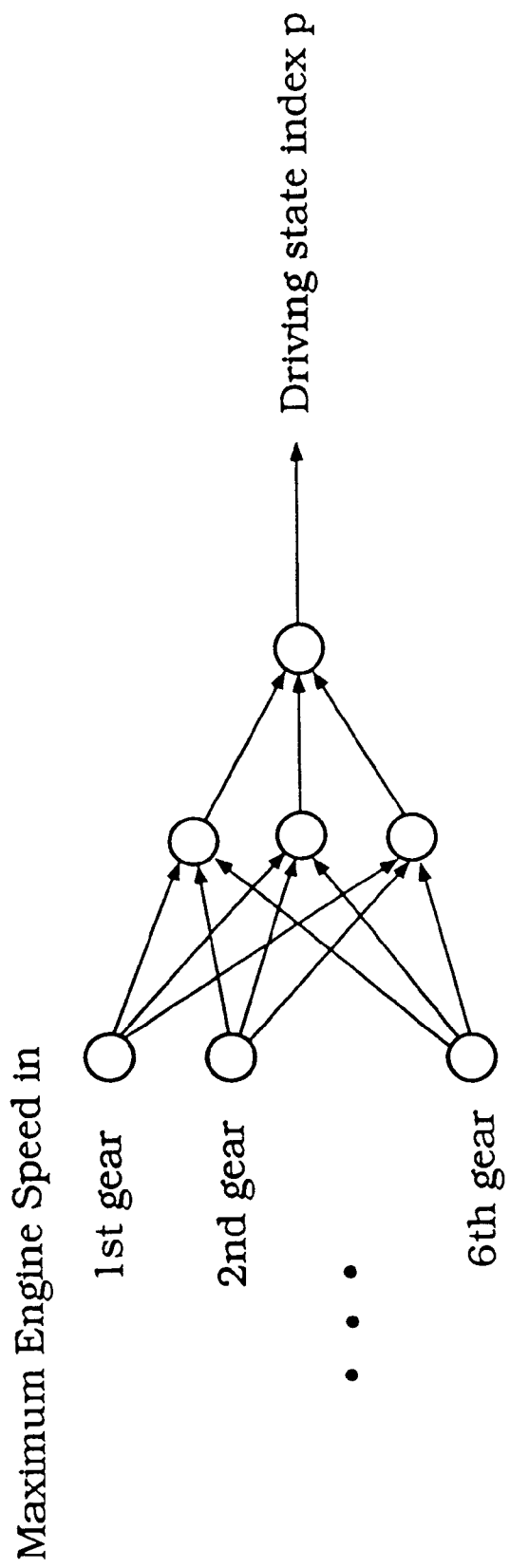
FIG. 8 shows a neural network which learns the relationship between the maximum r.p.m. at each gear position and a driving state index P.

In addition, as shown in FIG. 7a, when all of the gears from the first through the sixth gears are used in a certain time period, the driving state index P is high. When only low gears are used in a certain time period, as shown in FIG. 7b, the driving state index P is slightly high. When only high gears are used in a certain time period, the driving state index P is low. In a normal vehicle, all of the gears are used during in normal driving, only low gears are used when on a congested road, and only high gears are used when on a freeway, and thus, according to the driving state index P output from the neural network which has learned as above, FIGS. 7a, 7b, and 7c presume normal driving, driving on a congested road, and driving on a freeway, respectively.

In the evaluation system, based on the driving state index P, the driving state at the moment is presumed, and an acceleration-weighting ratio α is determined by judging whether the user prefers fuel efficiency or acceleration performance (step 3).

Figure 9:
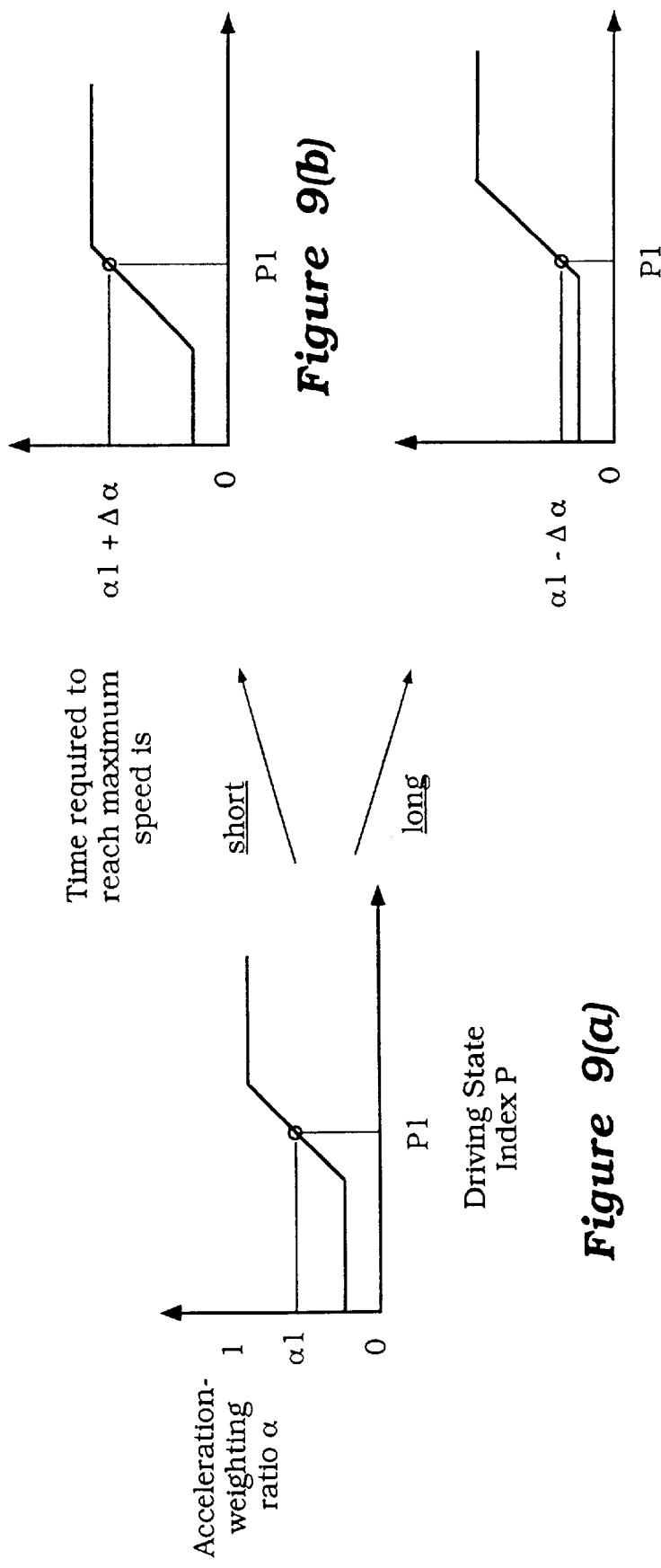
FIG. 9 shows the relationship between the acceleration-weighting ratio $\alpha$ and the driving state index P, used in the evolutionary-adaptation hierarchy according to the present invention.

The acceleration-weighting ratio α can be determined from a predetermined equation of an acceleration-weighting ratio α and a driving state index P, as shown in FIG. 9. For example, when driving on a freeway and the driving state index P is low (see FIG. 7c), the acceleration-weighting ratio α is low, i.e., fuel efficiency is regarded as important. Conversely, when the driving state index P is high, i.e., sporty driving (FIG. 6a), the acceleration-weighting ratio α is high, i.e., acceleration performance is regarded as important.

Figure 10:
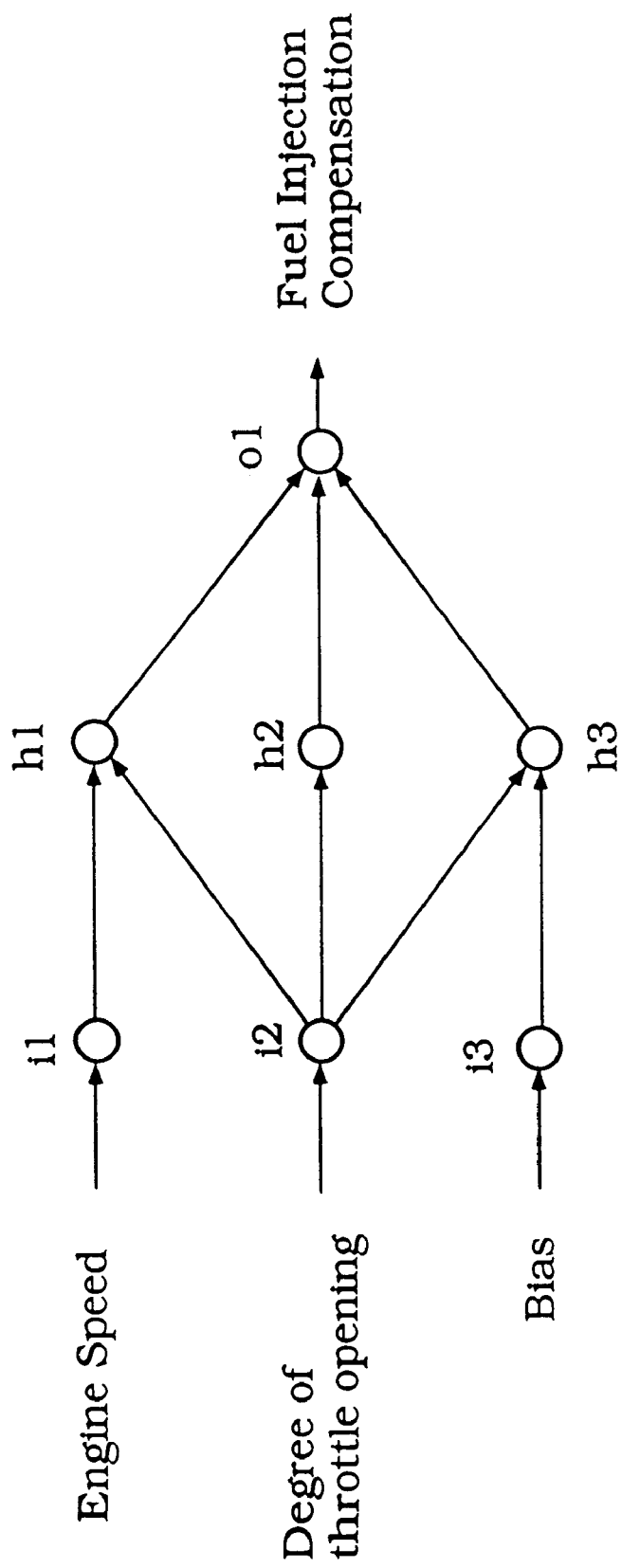
FIG. 10 shows a hierarchical neural network comprising two inputs and one output, which network is installed in the evolution system of the evolutionary-adaptation hierarchy.
Figure 11:
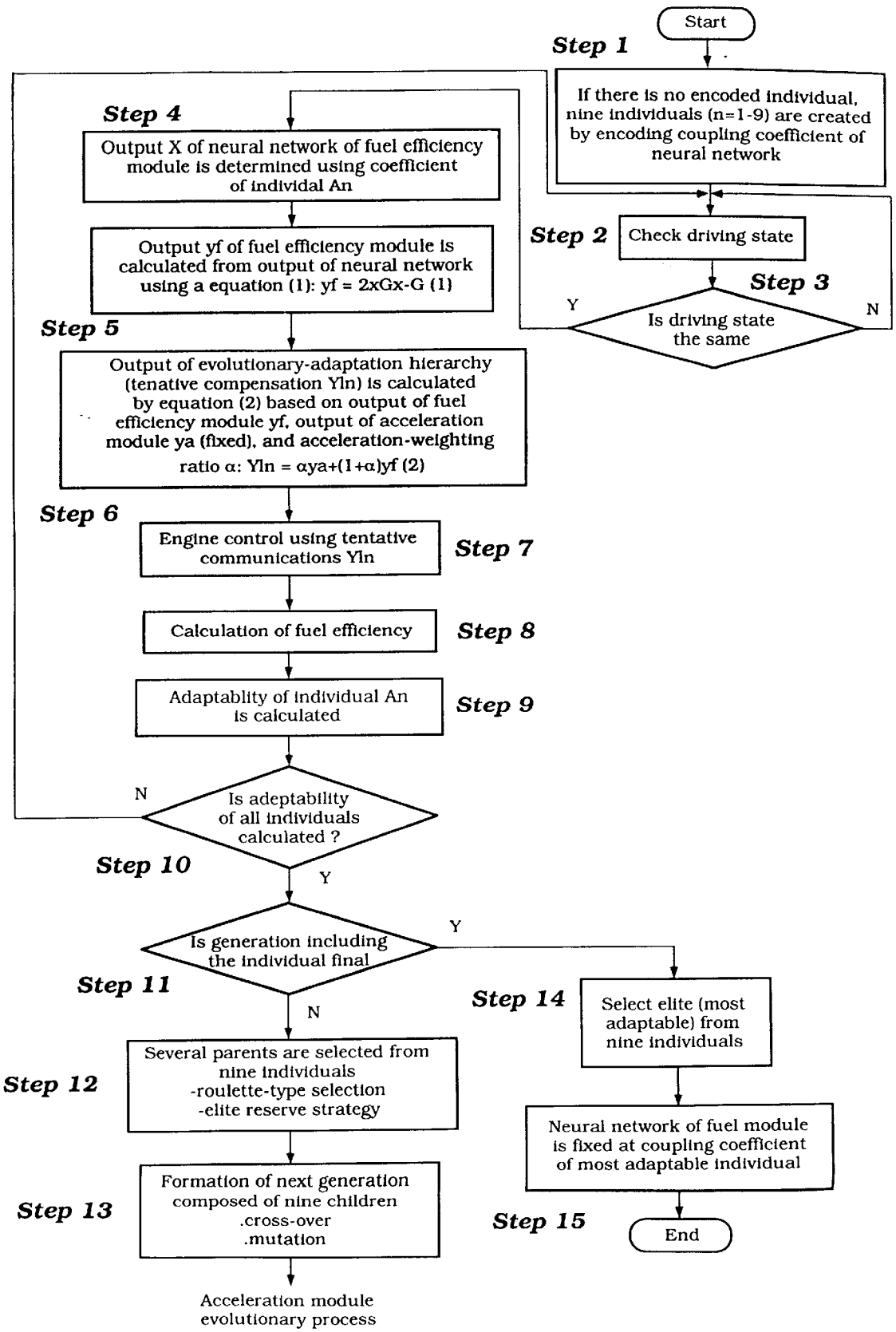
FIG. 11 is a flow chart showing the evolution of the fuel efficiency module using genetic algorithm according to the present invention.

The evolutionary-adaptation system is comprised of at least one fuel efficiency module and one acceleration module, and causes them to mutually cooperate and compete to obtain a change to be more adaptable or suitable. Each module is comprised of a hierarchical neural network comprising two inputs and one output, as shown in FIG. 10. The fuel efficiency module aims at improving fuel efficiency, and the acceleration module aims at improving acceleration performance. The input into each module comprises the engine speed and the degree of the throttle opening. Based on the input, each module outputs a compensation for the fuel-injection quantity (i.e., compensation for the control base value from the reflection hierarchy).

The evolutionary-adaptation hierarchy evolves the degree of coupling in the neural network constructing the fuel efficiency module and that of the acceleration module, alternately, using a genetic algorithm in accordance with the user's preference and the using environment, i.e., the evaluation by the evaluation system (step 4). After completing the evolution of both modules, the degree of coupling of each module is fixed to the evolved degree, and using an evolutionary compensation Y based on the output from both modules, the engine is controlled (step 5). In the above, the genetic evolution of the modules in step 4 takes place in each module alternately, wherein while the fuel efficiency module is evolving, the degree of coupling of the neural network in the acceleration module is fixed, and vice versa.

The engine control using an evolutionary compensation Y in the evolutionary-adaptation hierarchy continues until the learning in the learning hierarchy described below is completed (step 6). Upon completion of the learning in the learning hierarchy, the fuel efficiency module and the acceleration module are reset, and the output from the evolutionary-adaptation hierarchy is set at zero (step 7).

Evolution of Module Using Genetic Algorithm

Figure 12:
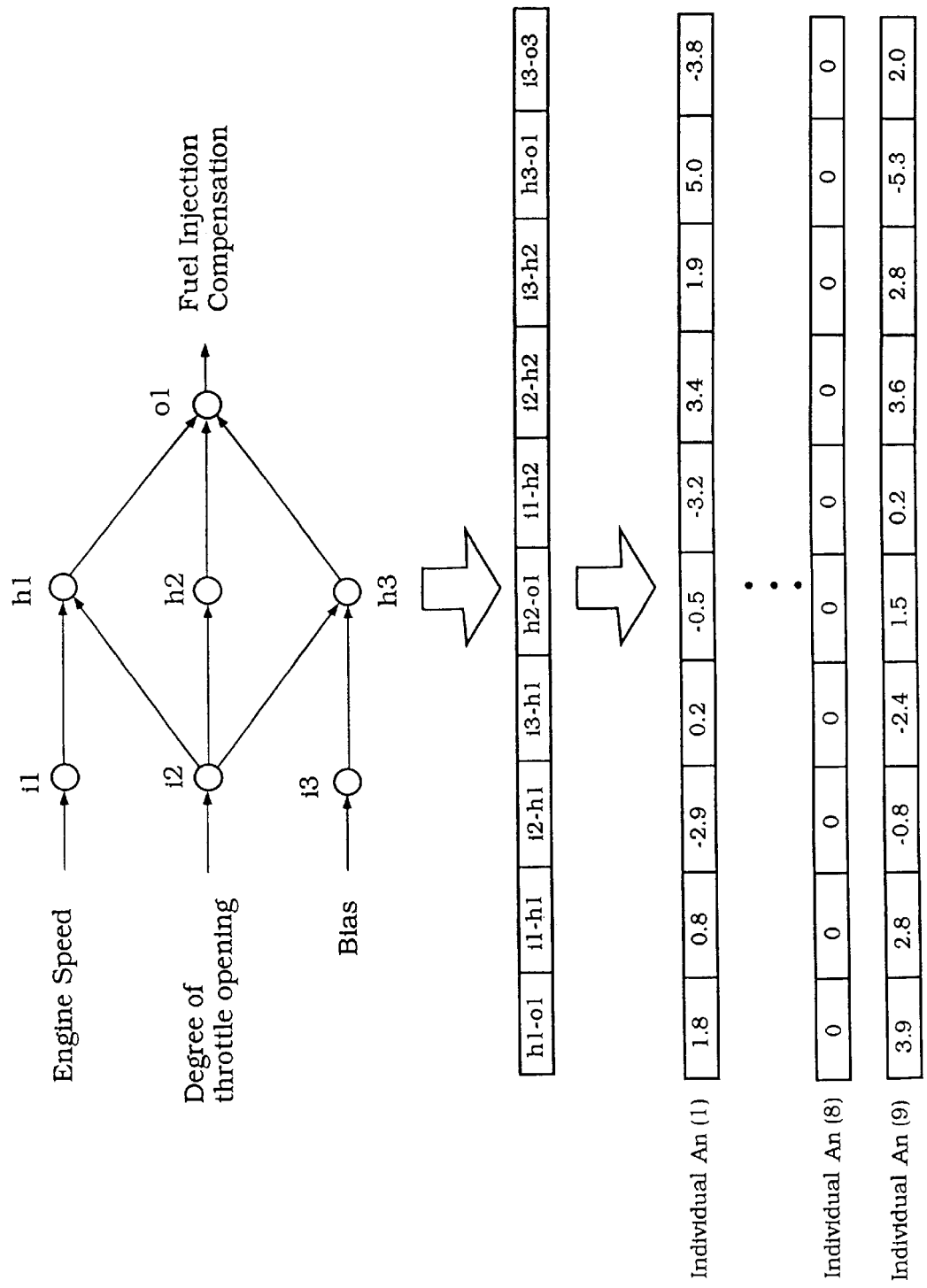
FIG. 12 is a schematic diagram showing an embodiment wherein a first generation is created, which is composed of multiple individuals $An(n)$ ($n=1-9$) encoded by coupling coefficients, used as genes, of the neural network constructing the fuel efficiency module.

The evolution of a module using a genetic algorithm will be explained with reference to a flow chart of FIG. 12 showing the evolution of the fuel efficiency module, as an example.

First, as shown in step 1 in FIG. 12, in the fuel efficiency module, a first generation is created, which is composed of multiple individuals An(n) (n=1–9, nine individuals in this embodiment) encoded by coupling coefficients, used as genes, of the neural network constructing the fuel efficiency module. Initial values of the genes, i.e., the coupling coefficients, of each individual are randomly set in a predetermined range (e.g., approximately –10 to 10). In the above, by creating one individual having a gene value (coupling coefficient value) of zero, it is possible to avoid abating, in the process of evolution, the performance characteristics lower than those before evolution.

For one of the individuals created in step 1, individual An(1) for example, output x of the neural network is determined using the fuel efficiency module based on the actual information (the engine speed and the degree of the throttle opening) (step 4). Output yf of the fuel efficiency module is determined by linear transformation of the output x using equation (1) (step 5). In the above, the information is the engine speed and the degree of the throttle opening, which are normalized.

$$yf = 2*Gx - G \qquad (1)$$

wherein yf is an output from the fuel efficiency module, x is an output from the neural network of the fuel efficiency module, and G is an output gain of the evolutionary-adaptation hierarchy. By linear transformation of the output x of the neural network, the output yf from the fuel efficiency module does not become extremely high, i.e., evolution progresses gradually as a whole. That is, an extreme change in engine behavior due to the evaluation or evolution is prevented.

After determining output yf of the fuel efficiency module for individual An(1), the output from the evolutionary-adaptation hierarchy (tentative compensation Yn(1)) is calculated by using a weighted mean of the output yf and an output ya of the acceleration module whose coupling coefficient is fixed (step 6). The summation in the weighted mean is determined by acceleration-weighting ratio α determined in the evaluation system. The tentative compensation Yn is expressed by equation (2).

$$Yn = \alpha ya + (1-\alpha) yf \quad (2)$$

wherein yf is the output from the fuel efficiency module, and ya is the output from the acceleration module. That is, when the acceleration-weighting ratio is 1, the tentative compensation Yn is an output only from the acceleration module. When the acceleration-weighting ratio is 0, the tentative compensation Yn is an output only from the fuel efficiency module.

After determining output Yn(1) of the evolutionary-adaptation hierarchy for individual An(1), this tentative compensation Yn(1) is actually output from the evolutionary-adaptation hierarchy, and is added to the control base value from the reflection hierarchy. The engine is operated by the output compensated for by the tentative compensation Yn(1) (step 7).

The evaluation system in the evolutionary-adaptation hierarchy receives feedback information related to fuel efficiency from the engine operated by the output compensated for by the tentative compensation Yn(1) obtained from individual An(1), followed by calculating fuel efficiency (step 8). Based on the result, individual An(1) is evaluated by determining adaptability of individual An(1) (step 9). In the above, fuel efficiency is calculated from the travel distance and the amount of consumed fuel.

The above steps 4 through 9 continue until determination of adaptability of each of nine individuals, individuals An(1) through An(9) created in step 1, is completed. After completion of the above determination of adaptability, the next process is activated (step 10). In the above, in order to evaluate the adaptability of each individual, the processes from steps 4 through 9 from individual An(2) are not conducted before checking driving conditions (step 2), and only when the driving conditions are the same as those for initial individual An(1) (step 3), is step 4 activated.

After determination of adaptability of all of the individuals is completed, it is determined whether or not the generation to which the individuals belong is the final generation (step 11). If it is not the final generation, parent individuals are selected (step 12). In this selection, a roulette-type selection method is employed, i.e., the parent individuals are stochastically selected based on the probability correlated to the adaptability of each individual.

In the above, if the alternation of generations is strictly performed, there is the possibility that individuals highly evaluated are destroyed. To prevent destruction of all individuals belonging to the previous generation, an elite reserve strategy is also employed, i.e., an elite (highly evaluated individual) remains alive unconditionally. In addition, to maintain the ratio of the maximum adaptability to the average adaptability in a group consisting of multiple individuals, the adaptability is linearly transformed.

After selecting parent individuals, cross-over is performed using the selected individuals as parent individuals to create a second generation composed of nine children (step 13). The cross-over between individuals may be single-point cross-over, double-point cross-over, or normal distribution cross-over.

The normal distribution cross-over is a method of creating children based on a rotation-symmetrical normal distribution with respect to an axis connecting the parents, using chromosomes expressed by the actual number (individuals). The standard deviation of the normal distribution are correlated with the distance between the parents in terms of the components in the direction of the main axis connecting the parents. Other components of the axis is made correlated with the distance between the line connecting the parents and a third parent sampled from the group. This cross-over method has an advantage that the characteristics of the parents are easily passed on to their children.

In addition, mutation of genes is caused in the created nine children by randomly changing the gene value (the degree of coupling) at a given probability.

Figure 14:
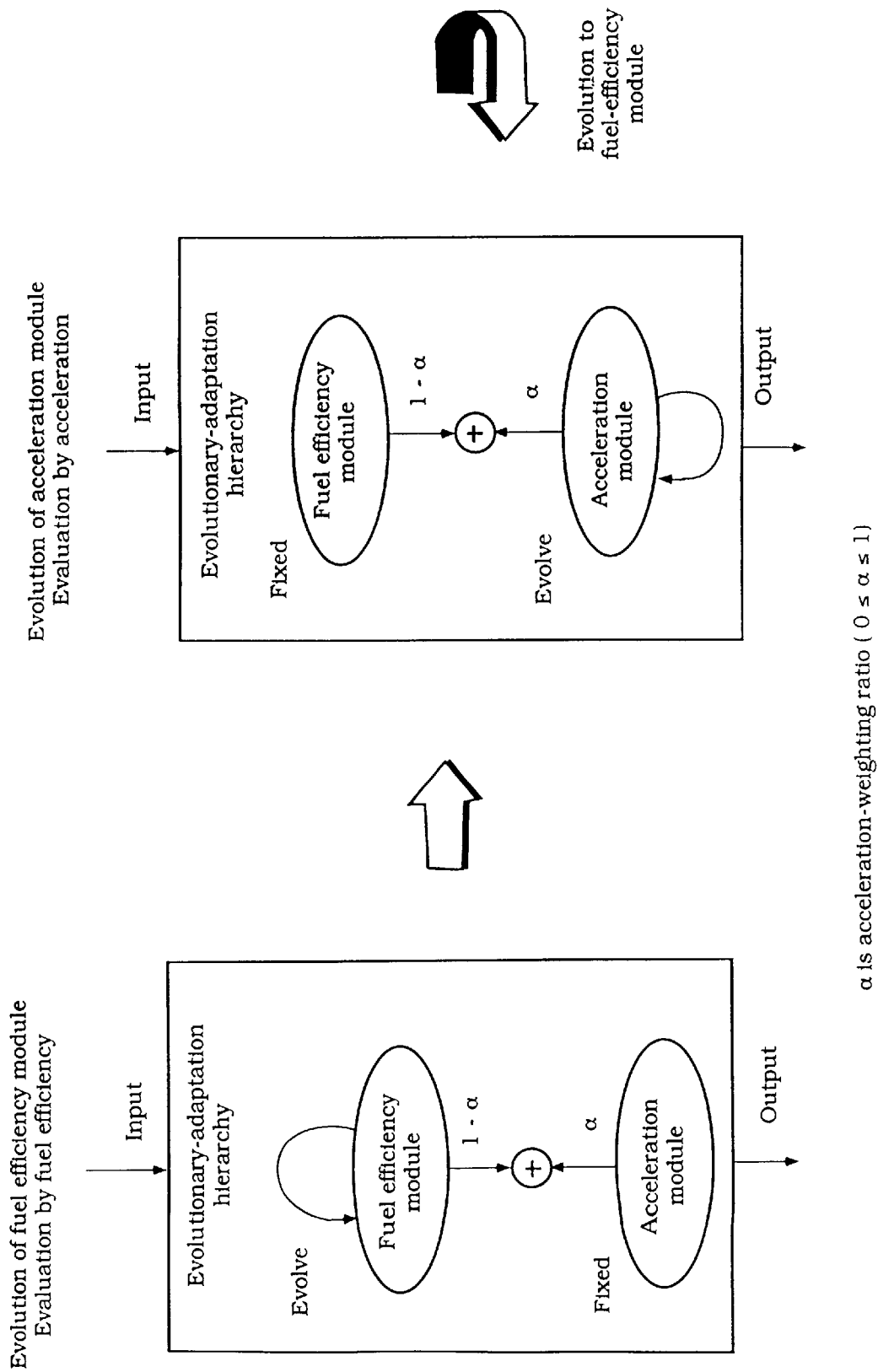
FIG. 14 is a diagram showing the alternate evolutionary processes in the fuel efficiency module and the acceleration module in the evolutionary-adaptation hierarchy.

By the above processes, after the second generation is created, the coupling coefficient of the neural network of the fuel efficiency module is fixed to that of an individual (elite), evolutionary treatment for the acceleration module starts. After the evolutionary treatment of the first generation of the acceleration module is completed, the processes are repeated from step 1, evaluation of each individual of the second generation, and selection are conducted (see FIG. 14). In the above, in step 1, it is determined whether or not there are encoded individuals, i.e., whether or not the generation is the second or more. If there are encoded individuals, no coding is conducted in step 1, and step 2 is activated.

This processes are repeated until the generation reaches the predetermined final generation. Accordingly, children composing each generation evolve in accordance with the evaluation in the evaluation system, i.e., the user's preference. It is determined in step 11 whether or not the generation is final. If it is determined in step 11 that the generation is final, an individual hiving highest adaptability (most adaptable individual), i.e., an elite, is selected from the nine children (step 14). The coupling coefficient of the neural network of the fuel efficiency module is fixed at the gene possessed by the most adaptable individual (step 15). The evolution of the fuel efficiency module ends.

Figure 13A:
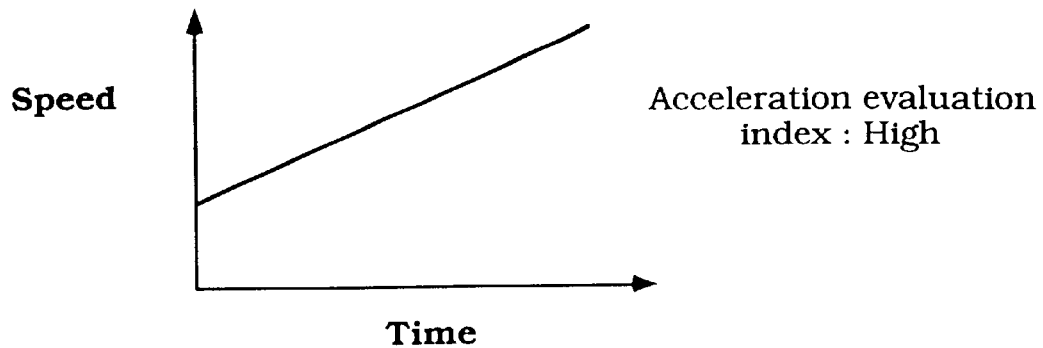
FIG. 13 is a diagram showing the relationship between a change in the speed of the vehicle and an acceleration evaluation index when the degree of the throttle opening is constant.
Figure 13B:
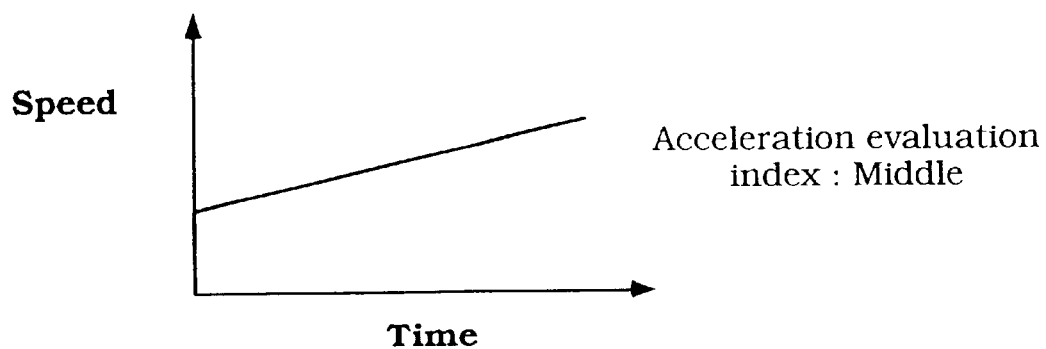
Figure 13C:
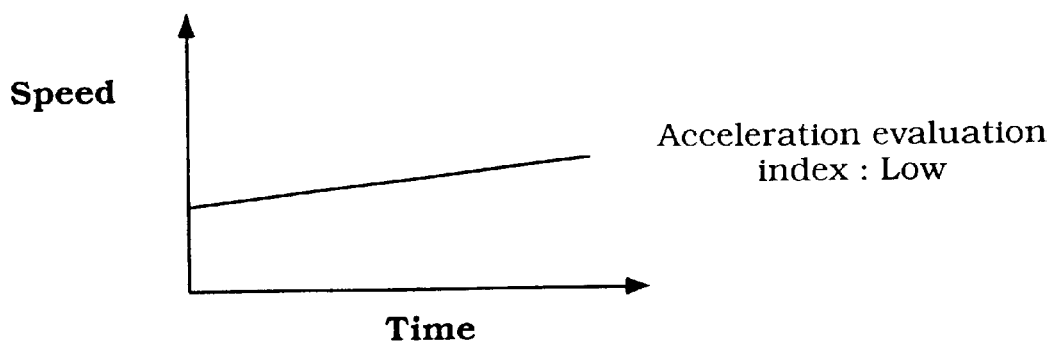

In the acceleration module, the same treatment as in the fuel efficiency module is conducted until the generation reaches the final generation. In the above, evaluation in steps 8 and 9 for the acceleration module is conducted using an acceleration evaluation index. The acceleration evaluation index is calculated by dividing the acceleration by the changing rate of the throttle opening. FIG. 13 shows the relationship between a change in the speed of the vehicle and an acceleration evaluation index when the degree of the throttle opening is constant.

In addition, in the above-described genetic algorithm, the following techniques (1)–(3) are also considered:

(1) Mutation of Overlapped Individual

Despite the fact that different individuals are selected as parents for cross-over, if they are genetically identical, mutation is caused to both parents at a higher probability than usual. In the above mutation, a change based on normal distribution is added to the selected gene.

(2) Avoidance of Cross-over of Same Individual

There is a possibility that one parent selected for cross-over is the same individual as the other parent. If no action to stop the occurrence is taken, diversity of the group will be lost. Thus, if the parents for cross-over are the same individual, one of the parents is replaced with another individual, thereby avoiding the above occurrence.

(3) Regeneration

Instead of cross-over, a regeneration technique, which replaces all the individuals in the group with other individuals at once.

By using the generic algorithm, evolution of the fuel efficiency module and the acceleration module is completed, and the neural network of each module is fixed to the coupling coefficient of the most adaptable individual. Accordingly, an evolutionary compensation Y is output from the evolutionary-adaptation hierarchy where the fuel efficiency module and the acceleration module are fixed.

This evolutionary-adaptation hierarchy Y is obtained by determining the output of the neural network of each module based on the input signal (the engine speed and the degree of the throttle opening), linearly transforming the output of each neural network using the aforesaid equation (1) to obtain outputs yf and ya from the respective modules, and calculating the weighted mean of the outputs yf and ya, using the aforesaid equation (2).

As described above, by creating multiple individuals in each module and conducting cross-over of them, competition of multiple individuals causes the module to evolve to be a better module (competition between modules of the same type). Further, by causing separately and alternately the fuel efficiency module and the acceleration module to evolve, the module which is changing can evolve to be adaptable in accordance with the output from the module which is not changing, thereby performing cooperation between the different modules. In the above, if summation of one of the control modules is small, the characteristics of the module are not readily expressed even if a genetic change is exerted on the control module. Thus, modules may be designed in such a way that only modules having a relatively large summation may receive a genetic change.

Learning Hierarchy Adapted to Engine Control

The learning hierarchy is comprised of two neural networks A and B, wherein while one of them is functioning for learning, the other is functioning for operation.

The learning hierarchy learns the relationship between the input and output of the evolutionary-adaptation hierarchy, in combination with the relationship between the input and output of the neural network functioning as a learning hierarchy for learning, after evolution of each module is completed in the evolutionary-adaptation hierarchy, thereby fixing the neural networks of the fuel efficiency module and the acceleration module at a degree of coupling of the most adaptable individual. Meanwhile, the output from the evolutionary-adaptation hierarchy does not change with time and is output by the fuel efficiency module and the acceleration module which caused the previous evaluation equation to be maximum.

Figure 16:
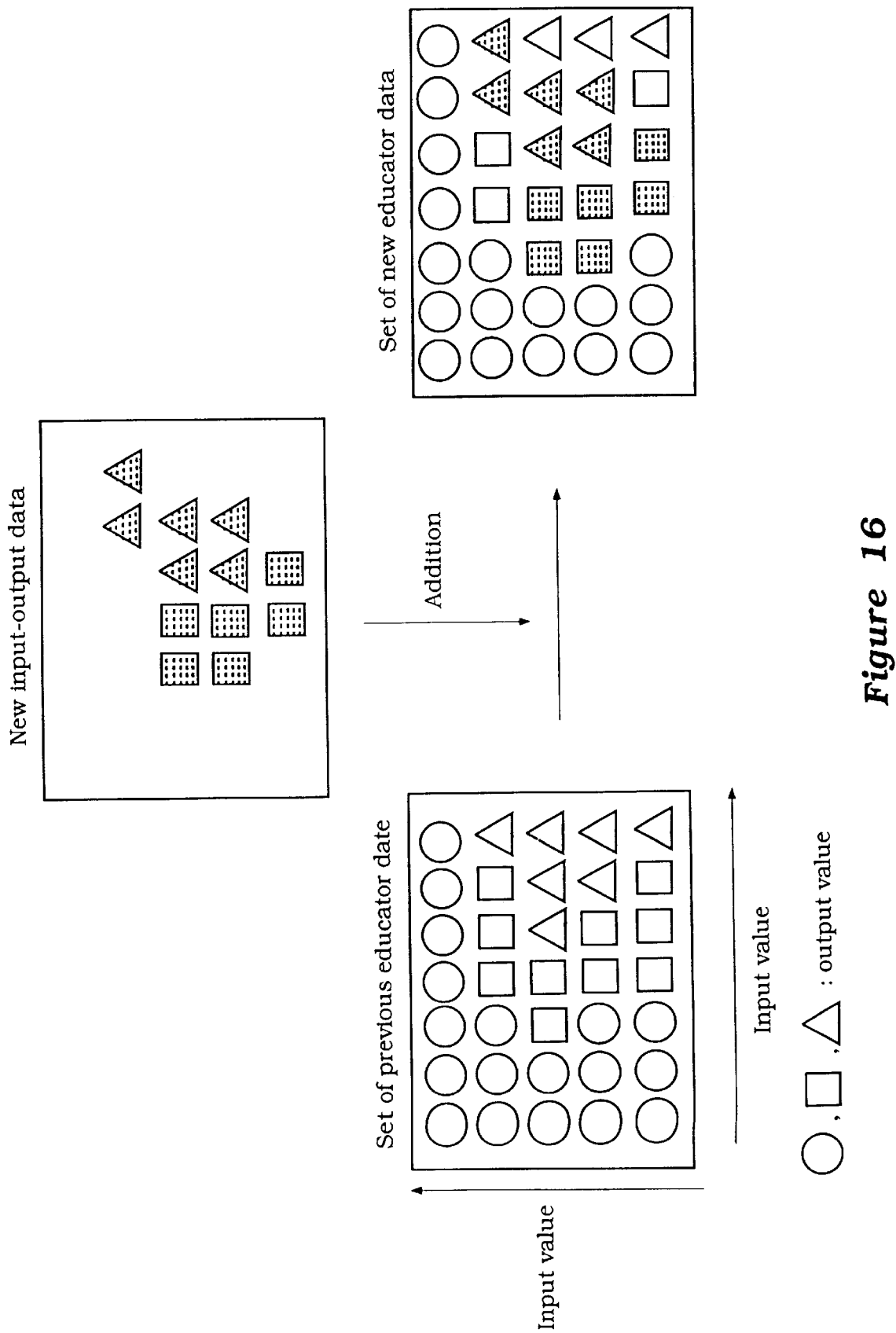
FIG. 16 is a diagram showing how to renew a set of educator data, wherein old educator data, whose Euclidean distance from the new data in a set of educator data is less than a given value, are replaced with the new data.

The aforesaid learning, the input and output of the evolutionary-adaptation hierarchy, and the input and output of the neural network for learning of the learning hierarchy are averaged at a given step width to use data of the input and output to renew a set of educator data. For example, if the average engine speed per second is 5,000 r.p.m.'s, and the average degree of the throttle opening is 20, the sum of these values and a fuel-injection compensation output from the evolutionary-adaptation hierarchy, and the neural network for operation of the learning hierarchy (i.e., an evolutionary compensation and a basic compensation), is used as input and output data (see FIG. 15). The thus-obtained input and output data are added to the previous educator data to obtain new educator data. In the above, old educator data, whose Euclidean distance from the new data in a set of educator data is less than a given value, are deleted. This process is shown in FIG. 16. The initial values of a set of educator data are set so as to output zero for all input data.

The learning hierarchy learns a coupling coefficient of the neural network for learning based on the renewed set of educator data. The learning continues until a deviation between (a) a presumed control output, which is obtained from an output from the neural network for learning (i.e., presumed compensation) and a control base value from the reflection hierarchy, and (b) the actual control output, is less than a threshold. After completing the learning, the neural network for learning is switched to that for operation, while the neural network previously for operation is switched to that for learning. After this process, the learning hierarchy determines the basic compensation using the newly-obtained neural network for operation, and actually outputs the result. When the learning hierarchy functions as above, the output from the evolutionary-adaptation hierarchy is zero, i.e., control is conducted by the learning hierarchy and the reflection hierarchy.

The initial value of the neural network for operation in the learning hierarchy is set so as to output zero. Accordingly, in an initial state, control can be conducted only by the reflection hierarchy and the evolutionary-adaptation hierarchy.

The coupling coefficient of the neural network for operation which has completed learning can readily be saved in external memory means such as a floppy disk and an IC card.

Overall Features and Other Features

As described above, after the evolution in the evolutionary-adaptation hierarchy is completed, and the learning hierarchy learns the evolution, the evolutionary-adaptation hierarchy is activated at given intervals as shown in FIG. 2 to check the presence of drift in the control particulars of the learning hierarchy. If there is drift, the fuel control module and the acceleration control module start evolution again. When the user uses an external memory means storing the coupling coefficient to activate the learning hierarchy using the coupling coefficient pulled out of the external memory means, checking drift in the control particulars of the evolutionary-adaptation hierarchy need not be conducted, and the output from the evolutionary-adaptation hierarchy may be fixed to zero, i.e., the evolutionary-adaptation hierarchy is inactivated. Upon instructions from the user to start, the evolutionary-adaptation hierarchy can be activated.

By evaluating the user's preference in the evolutionary-adaptation hierarchy and accordingly evolving the fuel control module and the acceleration control module, the engine 1 is "trained" to suit the user's preference, e.g., a fuel efficiency-weighted type or a drivability-weighted type. Further, by activating the evolutionary-adaptation hierarchy at given intervals, a course of training can be changed in accordance with a change in the user's preference or a change in the engine or the vehicle itself with age.

The advantages in causing the evolutionary-adaptation hierarchy to evolve while limiting compensations and in causing the learning hierarchy to learn the evolution, are the following:

a. Diversity of the control modules in the evolutionary-adaptation hierarchy remains, and a wide range reference which is the feature of the genetic algorithm can be performed.

b. High-speed and more intellectual information processing in the learning hierarchy can be obtained from trial-and-error-type information processing in the evolutionary-adaptation hierarchy. Although this feature is not very significant in the engine control described above, the feature is very advantageous in route control of locomotive robots.

In the aforesaid example, two control modules are made for acceleration and fuel-efficiency, respectively. However, control modules can be made for fuel-injection quantity, the ignition timing, or the like. In the above, when the length of an intake pipe can be controlled, for example, the existing control modules need not be changed, but simply by adding an intake pipe length control module, integrated control can be performed. In addition to the above, control output for controlling an engine can be the degree of the electric throttle opening, the timing of activation of intake and exhaust valves, the degree of valve lift, the timing of activation of intake and exhaust control valves, or the like (see FIG. 3). In the above, the intake control valve is a valve provided in an intake pipe in order to control a tumbler and swirl. The exhaust control valve is a valve provided in an exhaust pipe in order to control exhaust pulsation.

In the aforesaid example, in the evolutionary process of the genetic algorithm, the fuel efficiency module and the acceleration module evolve alternately, wherein one generation evolves at a time. However, the evolutionary process is not limited to the above. For example, the following process is possible: First, the acceleration module is fixed, and the fuel efficiency module evolves until it reaches the final generation to obtain the most adaptable control module, thereby fixing the fuel efficiency module to the most adaptable control module, and then the acceleration module starts evolving.

Further, the modules used in the aforesaid example are divided into two, the fuel efficiency module and the acceleration module, and each module is subjected to evolutionary treatment using genetic algorithm. However, the number of the modules used is not limited to two, and it can be one or three or more.

In addition, in the genetic algorithm in the aforesaid example, evolution is completed when reaching the predetermined final generation. However, the timing of completion of evolution is not limited to the above, and for example, evolution can be completed when the degree of evolution of evolving individuals exceeds a predetermined evaluation range.

Figure 17:
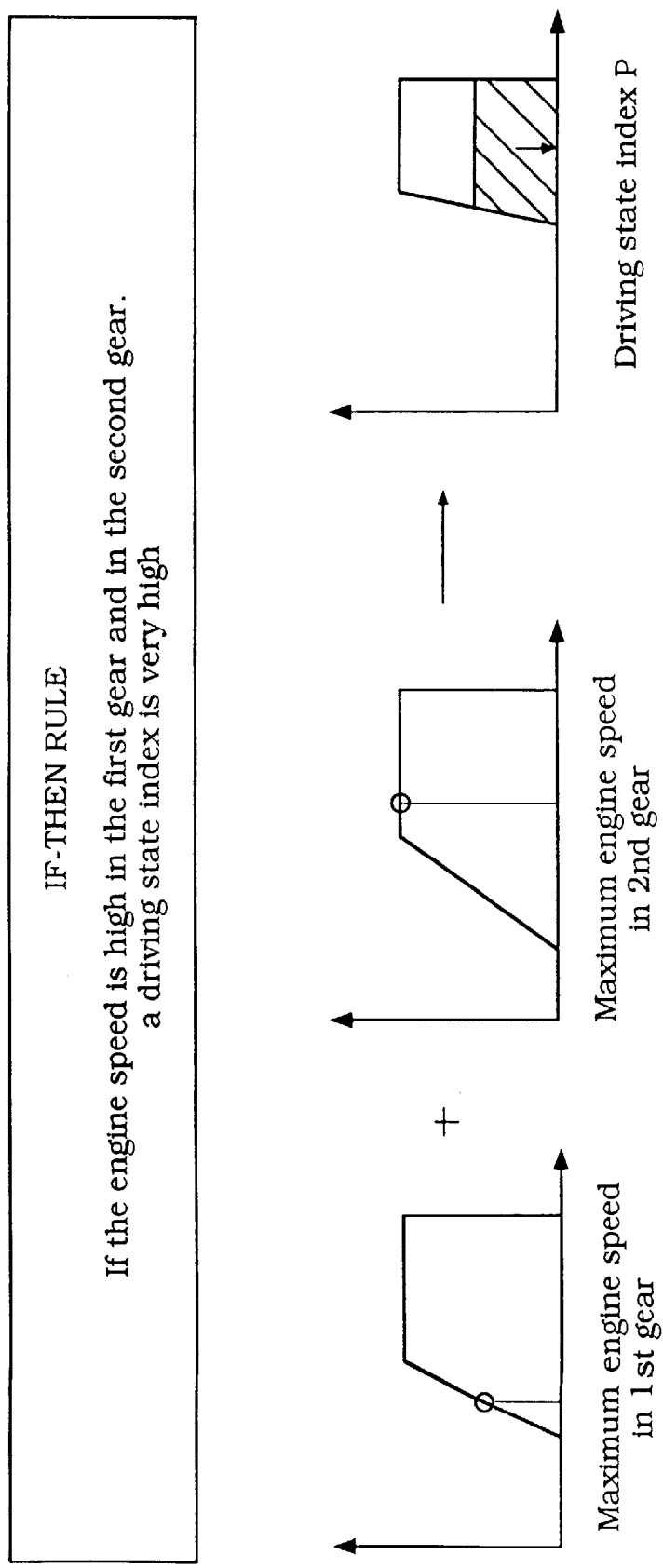
FIG. 17 is a diagram showing how to presume the driving state index P using an IF-THEN rule, "if the maximum engine speed is high in the first gear and in the second gear, the driving state index P is extremely high" according to the present invention.

In the aforesaid example, the driving state index P for presuming the driver's preference and driving conditions is presumed using the neural network based on the distribution pattern of the gear position and the maximum r.p.m. However, the method of presuming the driving state index P is not limited to the above, and any given method can be employed, such as fuzzy presumption. When presuming the driving state index P, an IF-THEN rule is described, and fuzzy presumption is performed (see FIG. 17). The IF-THEN rule is, for example, "if the maximum engine speed is high in the first gear and in the second gear, the driving state index P is extremely high."

In the neural network, the coupling coefficient is determined by learning from the educator data, i.e., a black box approach. When fuzzy presumption is employed, an approach based on knowledge at the time of designing the product is feasible.

The user's preference is determined by a distribution pattern of the gear position and the maximum engine speed in the aforesaid example. However, parameters to determine the user's preference are not limited to the above, and any given parameters can be used. For example, by installing a detecting device for detecting a user's physiological index, such as heart beat, blood pressure, body temperature, and brain waves, in a helmet, gloves, or boots in the case of a motor bike, the user's preference can be determined. Further, these physiological indices can be used for evaluating the user's state (driving state of the driver).

In the aforesaid example, upon evaluating the user's preference, training is conducted in accordance with the preference. Parameters to determine a course of training are not limited to the above, and for example, upon evaluating the user's skill, training can be conducted in accordance with the skill. In the above, parameters to evaluate the skill are the degree of tilt of the vehicle, acceleration in the vertical direction of the vehicle, the use of the brake, the operating ratio of the front brake to the rear brake, and the like.

Further, in the aforesaid example, the leaning hierarchy is comprised of a hierarchical neural network. However, the basic structure of the control system of the learning hierarchy is not limited to the above, and for example, CMAC (Cerebellar Model Arithmetic Computer) can be used. CMAC is excellent in terms of additional learning and a high speed of learning, as compared with the hierarchical neural network.

Various Aspects of the Invention

As described above, the present invention includes various aspects as follows:

1) An integrated control system, comprising steps of: judging characteristics of a user and using conditions; and changing characteristics of a control system controlling a subject to be controlled depending on said characteristics of the user and using conditions based on a judged result.

2) In 1), said characteristics of said user and circumstances of use is presumed by using a neural circuit network or fuzzy rule.

3) In 1) or 2), said characteristics of said user and circumstances of use is at least one of a user's preferences, skill and condition.

4) In 1), 2) or 3), said control characteristics can be adaptively changed in accordance with changes in using environment and/or age-based deterioration of a subject to be controlled.

5) In 1), 2), 3) or 4), a framework of a control system is comprised of a three-hierarchial structure such as a reflection hierarchy as a bottom hierarchy, a learning hierarchy as a middle hierarchy and evolutionary-adaptation hierarchy as a top hierarchy.

6) In 5), a basic amount of said control output is output from said reflection hierarchy, while outputs from said learning and evolutionary-adaptation hierarchy are compensatory amount relative to said basic amount.

7) In 5) or 6), said evolutionary-adaptation hierarchy includes at least one control module which behaves autonomically, and said control system can be adaptively modified by competition and cooperation of said control module.

8) In 7), there are plural control modules, and said control system can be adaptively modified by competition and cooperation of said plural control modules.

9) In 8), output ratio of plural control modules of said evolutionary-adaptation hierarchy is varied depending on characteristic(s) of a user and circumstances of use.

10) In 7), 8) or 9), said accord and competition are performed by genetic algorithm or multiagent systems.

11) In 10, when according/competing said control modules of said evolutionary-adaptation hierarchy by using said genetic algorithm, it is arranged that an output of one of plural individuals produced from said control modules is constantly set to have zero value, while an initial state of other individuals is determined randomly within a predetermined range, and during an evolutionary process by crossing of said individuals, a performance of each individual is prevented from being lessened than a performance before the evolution.

12) In 10) or 11), a performance function in the genetic algorithm can be automatically changed depending on characteristics of a user and/or circumstances of the use.

13) In 12), a relationship between said performance function and characteristics of a user and/or circumstances of the use can be changed by a user's instruction.

14) In 5) through 13), an output gain of said evolutionary-adaptation hierarchy is arranged to be limited.

15) In 5) through 14), said learning hierarchy consists of two different neural networks, such as operation and learning neural circuit networks.

16) In 15), a control characteristic obtained by the evolution of a control module in said evolutionary-adaptation hierarchy is learned in a learning neural circuit network in said learning hierarchy.

17) In 16), said learning hierarchy has a set of educator data for learning, and a sum of outputs in said operational neural network for both evolutionary-adaptation and learning hierarchy is output. Only the sum output during a certain period of time in the past is used for renewing the neural circuit network in said learning hierarchy as new educator data, while educator data in other regions is regarded as old data.

18) In 15), 16) or 17), after said learning neural circuit network is completed, said learning neural circuit network functions as the execution network, and said neural circuit network previously functioning as the execution network comes to function as the learning neural circuit network.

19) In any one of 15)–18), information regarding the learned neural circuit network in said learning hierarchy is recorded in an external memory device such as a floppy disc or IC card so as to store and retrieve the memory.

20) In any one of 5) through 19), said reflection hierarchy is arranged to perform by using either one of a formula model, fuzzy rule, neural circuit network, map, or subsumption architecture.

21) In any one of 3) through 20), a user's skill is presumed based on said external conditions, and the function of the power source is changed depending on the presumed skill.

22) In any one of 2) through 20), a user's condition is presumed by using a physiological index, and performance of the power source is changed based on the presumed user's conditions.

23) In 22), said physiological index refers to either one or more of pulse, blood pressure, body temperature and an electro-encephalogram.

24) In any one of 1) through 23), said subject to be controlled is arranged to actively function.

25) In 24), said subject to be controlled is comprised of an engine.

26) In 25), said engine is an automobile engine, a user's characteristics are analyzed by his/her preferences, technical skill, and/or physical and mental states, and operational characteristics of the engine are modified based on the analysis.

27) In 26), a detection means detecting an operational state of a vehicle is further included, wherein an operational state index, which matches at least either one of or both of (a) user's preferences and skill and (b) operational state and driving conditions of the engine, is presumed based on at least part of the detection results. Operational characteristics of the engine are modified based on said operational state index.

28) In 27), said operational state index is presumed by using either one of or both of said neural circuit network and fuzzy rule.

29) In 27) or 28), it is further characterized in that the performance function in said genetic algorithm, in which said control module in said evolutionary-adaptation hierarchy performs competition and cooperation, is modified based on said operational state index.

30) In 29), a relationship between said performance function and operational state index is modified based on time to reach a maximum engine speed at each gear position, rate of change of an engine speed and input by an operator using an instruction input button.

31) In 27), 28), 29) or 30), said detection means detecting the operational state of said vehicle is a detection means detecting engine speed and gear positions.

32) In any one of 25) through 31), it is further characterized in that a fuel injection volume, ignition timing, electronic throttle opening angles, intake/exhaust valve timings, valve lift amount, intake/exhaust control valve timings are utilized for the control output for modifying the operational characteristics of the engine.

33) In any one of 26) through 32), it is further characterized in that a user's skill is presumed based on at least one of the following factors, such as the user's clutch operation speed, tilt of a vehicle, an acceleration degree of a vehicle in vertical directions, brake usage and ratio of usage of front/rear brakes.

34) In any one of 26) through 33), it is further characterized in that at least one means to detect an operator's physiological state is mounted in accessories worn by the user, and the user's condition is presumed based on a detected physiological state.

35) In 34), said accessories refer to either one or more of helmet, gloves and boots.

36) In 24), said subject to be controlled is an auxiliary power of a bicycle or wheel chair driven by an electric motor or engine, and a control characteristic of the control system refers to an assisting characteristic of said auxiliary power.

37) In 24), said subject to be controlled is a robot, and a control characteristic of the control system refers to operational characteristics of said robot.

38) In 37), said operational characteristics refers to at least one of a path selection, the manner of arm movement, moving speed or the manner of speaking of said robot.

39) In 37) or 38), said robot is a personal robot.

40) In any one of 1) through 23), said subject to be controlled is arranged to passively operate.

41) In 40), said subject to be controlled is a steering system of a vehicle, and said characteristic of said control system refers to a steering control characteristic of said steering system.

42) In 40), said subject to be controlled is a suspension system or seat of a vehicle, and said characteristic of said control system refers to a damper characteristic of said suspension system or seat.

43) In 41) or 42), a user's characteristics are analyzed by his/her preferences, technical skill, and/or physical and mental states, and operational characteristics are analyzed by the driving state of the vehicle, and control characteristics of the control system are modified based on the analysis.

44) In 43), the system further includes a detection means detecting an operational state of a vehicle, wherein an operational state index matching at least either one of or both of a user's preferences and skill, and/or operational state and driving condition of the engine is presumed, at least partially based on the detection results, and the operational characteristics of the engine are modified based on said operational state index.

45) In 44), said operational state index is presumed by using either one of or both of said neural circuit network and fuzzy rule.

46) In 44) or 45), the system is further characterized in that the performance function in said genetic algorithm, in which said control module in said evolutionary-adaptation hierarchy performs competition and cooperation, is modified based on said operational state index.

47) In any one of 43)–46), the system is further characterized in that a user's skill is presumed based on at least one of the following factors, such as the operator's clutch operation speed, tilt of a vehicle, the degree of vertical acceleration of a vehicle, brake usage and ratio of usage of front/rear brakes.

48) In any one of 43)–46), the system is further characterized in that at least one means to detect a user's physiological state is/are mounted in accessories worn by the user, and the user's physical or mental state is presumed based on a detected physiological state.

49) In 48), said accessories refer to either one or more of a helmet, gloves and boots.

It will be understood by those of skill in the art that numerous variations and modifications can be made without departing from the spirit of the present invention. Therefore, it should be clearly understood that the forms of the present invention are illustrative only and are not intended to limit the scope of the present invention.

What is claimed is:

1. A method of real-time controlling an operation signal outputted from a control unit to operate a machine, output of which machine is manipulated by a user, said control unit being programmed to formulate multiple control modules under predetermined rules, each control module outputting an operation signal when receiving a pre-selected signal including a signal from the user, said method comprising the steps of:

(a) formulating multiple control modules;

(b) inputting to the multiple control modules a pre-selected signal including a signal from the user to output from the control module an operation signal into the machine;

(c) manipulating output of the machine by the user;

(d) while the machine is in operation, selecting at least one control module from the multiple control modules, which is adaptive to the user's manipulation pattern;

(e) formulating subsequent multiple control modules based on the selected control module(s), if the selected control module is not final;

(f) repeating steps (b) through (e) at predetermined times, wherein the machine is operated adaptively to the user on a real-time basis, using the finally selected control module.

2. The method according to claim 1, wherein the input-output relationship of each control module is regulated by parameters, and in step (e), the multiple control modules are formulated by evolutionary computing wherein the parameters are used as genes.

3. The method according to claim 1, wherein steps (a) through (f) are repeated periodically while the machine is in operation.

4. The method according to claim 1, wherein steps (a) through (f) are repeated on the user's request.

5. The method according to claim 1, wherein information on the finally selected control module is saved in a memory and retrieved on the user's request.

6. The method according to claim 1, wherein the user's manipulation is for controlling output of the machine, and steps (a) through (f) are performed without the user's knowledge.

7. The method according to claim 1, wherein the user's manipulation pattern is evaluated by fuzzy rules.

* * * * *